Dec. 8, 1942.　　　C. S. McCARTHY　　　2,304,266
BRAKE ACTUATING SYSTEM AND APPARATUS
Filed Dec. 30, 1939　　　3 Sheets-Sheet 1
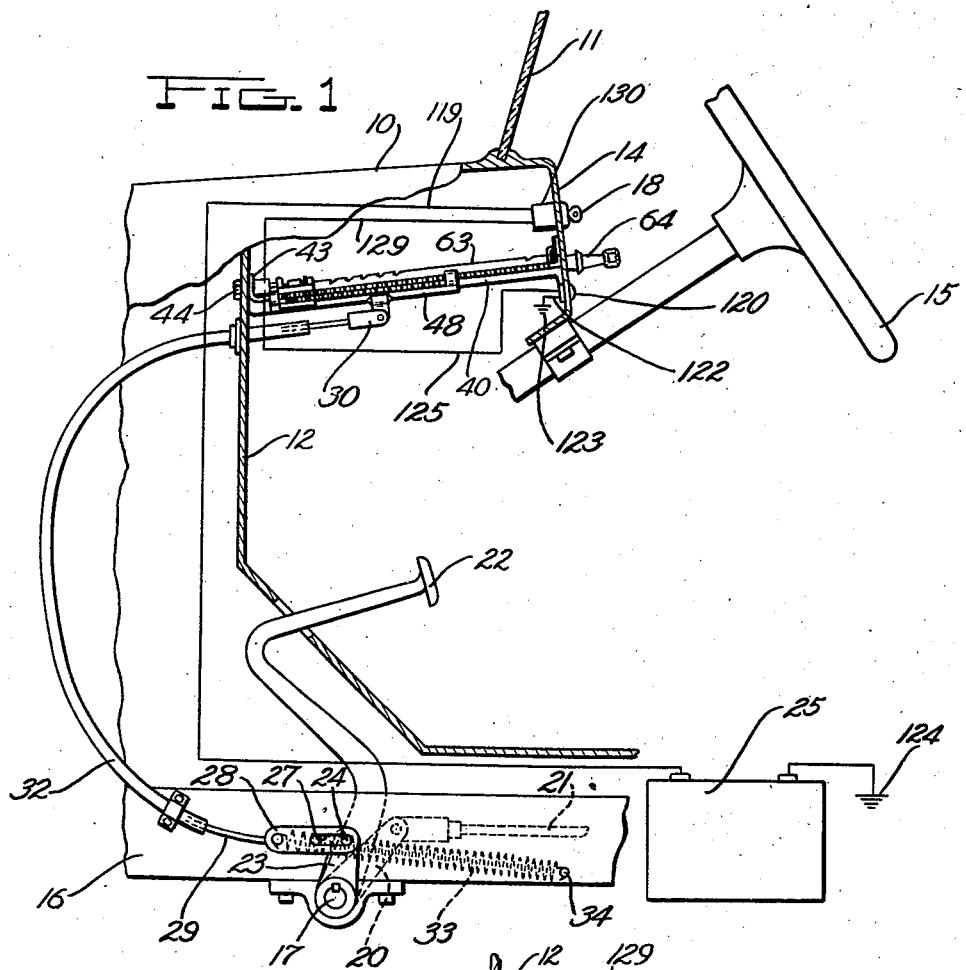
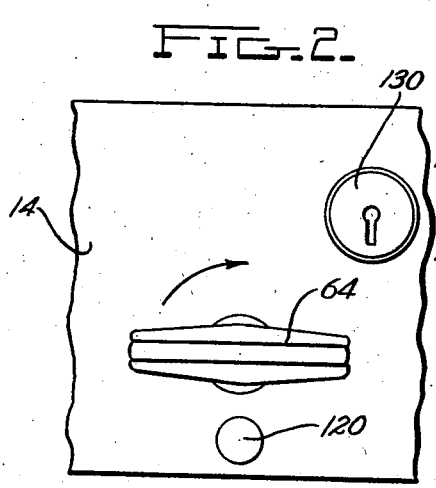
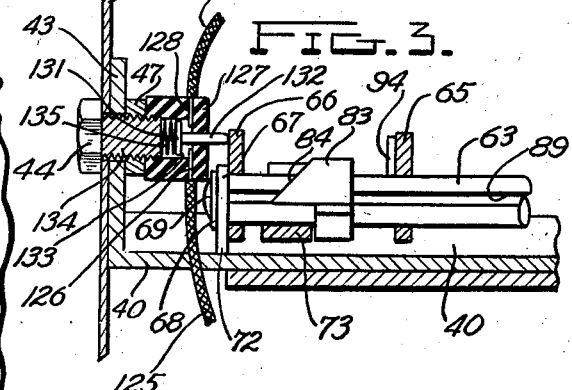
INVENTOR
*Charles S. McCarthy*
BY
*Braselton, Whitcomb Davies*
ATTORNEY

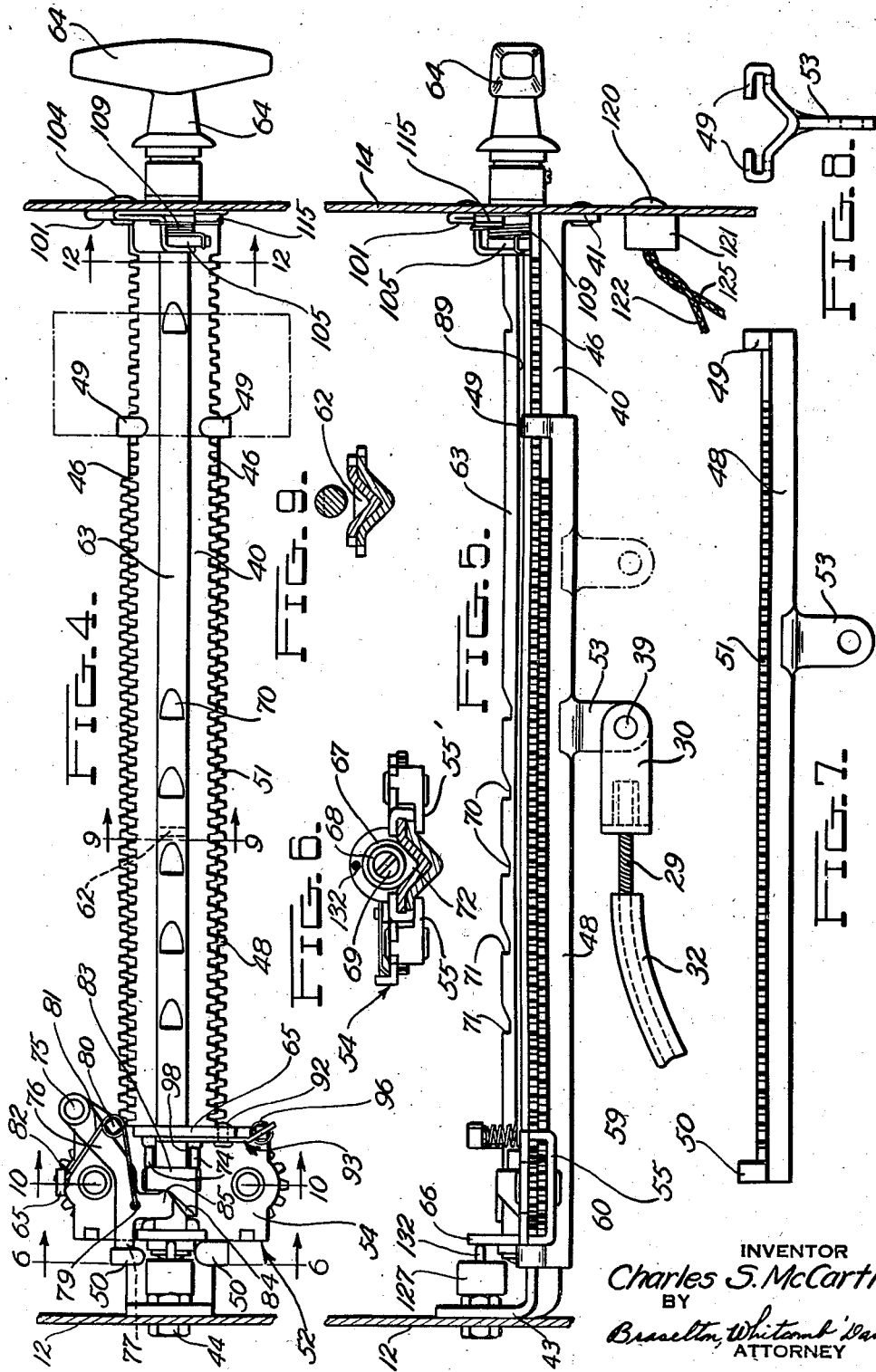

Dec. 8, 1942.  C. S. McCARTHY  2,304,266
BRAKE ACTUATING SYSTEM AND APPARATUS
Filed Dec. 30, 1939  3 Sheets-Sheet 3
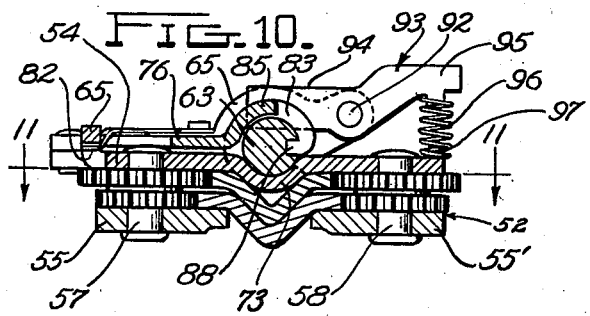
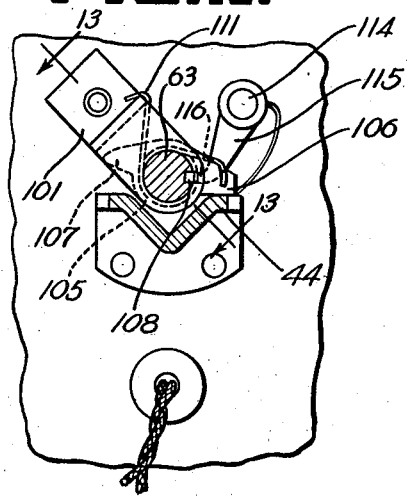
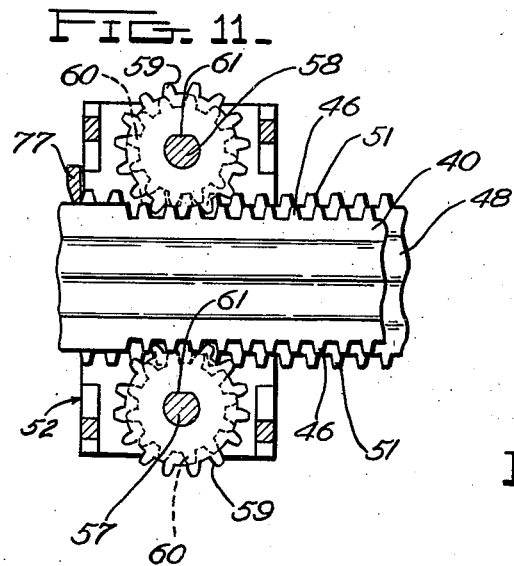
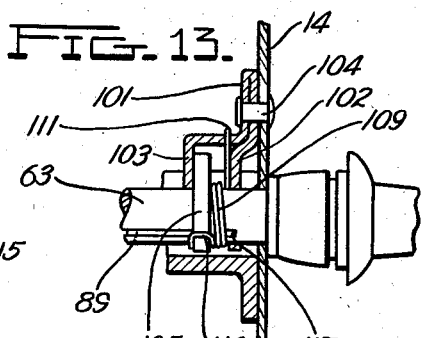
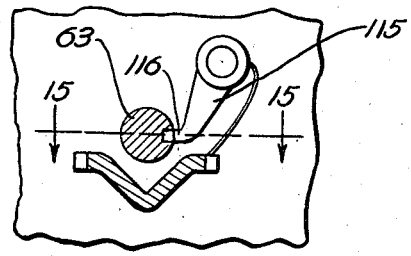
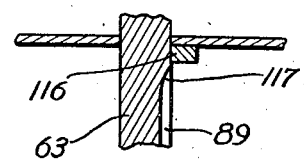
INVENTOR
Charles S. McCarthy
BY
Braselton, Whitcomb Davies
ATTORNEY Patented Dec. 8, 1942

2,304,266

UNITED STATES PATENT OFFICE 2,304,266

BRAKE ACTUATING SYSTEM AND APPARATUS

Charles S. McCarthy, Toledo, Ohio, assignor to The Bingham Stamping Company, a corporation of Ohio Application December 30, 1939, Serial No. 311,899

13 Claims. (Cl. 74—502)

This invention relates to mechanism actuating system and apparatus, and more particularly to a system and apparatus for actuating or controlling a braking system of an automotive vehicle.

The invention has for an an object the provision of an arrangement for visually indicating by means of a signal the position of the brake control mechanism for determining whether the brakes are in "set" or "released" position.

The invention is inclusive of a mechanism control apparatus embodying a novel force multiplying means of simple yet effective construction and a manipulating means operating in conjunction with the force multiplying means which may be normally in a predetermined position whether the brakes are in "set" or "released" position.

The invention includes the provision of force multiplying means in conjunction with a manipulating member wherein repeated movements of the manipulating member cause repeated movements of the force multiplying mechanism to effect a setting of the brakes of the vehicle.

Another object of the invention is to provide a system wherein a brake manipulating member may be moved at all times to a predetermined fixed position out of the way of the vehicle operator when the brakes are in both "set" and "released" positions in conjunction with an illuminated signalling means for indicating whether or not the brakes are in "set" or "released" position.

The invention provides a brake manipulating means of the "direct pull" type incorporating novel force multiplying means and a manipulating member so arranged to repeatedly hitch with the force multiplying mechanism upon successive movements thereof in one direction until the braking mechanism is effectively brought to "set" position.

Still another object of the invention is the provision of a brake setting means correlated with an electrically energized signalling means for indicating the setting of the brakes of the vehicle.

Figure 1 is an elevational view showing a portion of the driver's compartment and cowl construction of a vehicle showing a form of my invention embodied therein;

Figure 2 is a view of a portion of the front face of the instrument panel;

Figure 3 is a vertical sectional view showing a portion of the apparatus of my invention;

Figure 4 is a top plan view of the apparatus of my invention;

Figure 5 is a side elevational view of the arrangement illustrated in Figure 4;

Figure 6 is a vertical sectional view taken substantially on the line 6—6 of Figure 5;

Figure 7 is an elevational view showing an element forming part of the invention;

Figure 8 is an end view of the part shown in Figure 7;

Figure 9 is a sectional view taken substantially on the line 9—9 of Figure 4;

Figure 10 is a transverse sectional view taken substantially on the line 10—10 of Figure 4;

Figure 11 is a transverse sectional view taken substantially on the line 11—11 of Figure 10;

Figure 12 is a transverse sectional view taken substantially on the line 12—12 of Figure 4;

Figure 13 is a fragmentary sectional view taken substantially on the line 13—13 of Figure 12;

Figure 14 is a fragmentary detail sectional view showing locking means forming a part of the invention;

Figure 15 is a fragmentary sectional view taken substantially on the line 15—15 of Figure 14.

While I have illustrated a system and apparatus as utilized in controlling the brakes of an automotive vehicle, it is to be understood that I contemplate the incorporation of my invention in any mechanism wherever the same may be found to have utility.

Referring to the drawings and particularly to Figure 1, there is illustrated the forward portion of an operator's compartment of an automotive vehicle including a cowl portion 10, wind shield 11, a dash board 12, an instrument panel 14, steering wheel 15, the body structure being carried upon a suitable chassis frame, a portion of which is shown at 16. The braking arrangement of the vehicle is inclusive of a shaft 17 extending transversely of the vehicle journalled in suitable brackets carried by the chassis frame structure 16. Secured to the brake cross shaft is a bell crank member 20, the latter being connected by means of a rod 21 to brake mechanism adjacent the wheels of the vehicle (not shown). The bell crank member 20 is connected to a service brake pedal 22 of usual construction. Also secured to the cross shaft 17 is a member 23 supporting a pin 24, the latter adapted for operation in a slot 27 in a member 28, the member 28 being operatively connected by means of a cable 29 or other suitable means to a clevis 30. The clevis is connected to the apparatus or mechanism control of my invention hereinafter described in detail. The cable 29 is preferably contained within a guiding sheath 32 for insuring proper operation of the cable and at the same time prevent kinking thereof. The member 28 is also connected to a spring 33 or other suitable means anchored to the frame of the vehicle as at 34 tending at all times to urge the cable 29 and associated mechanism toward "brake released" position. The pin 24 coacts with slot 27 and permits the brakes to be independently set by means of the service pedal 22 without interfering with the operation of the brake control system and apparatus of my invention.

The system and apparatus of my invention is inclusive of a support or a member 40 having ear portions 41 secured to the instrument panel 14 by means of suitable bolts 42, the other extremity of the support 40 having a laterally extending projection 43 which is secured to the dash board 12 or other suitable portion of the vehicle by means of a bolt 44 and nut 47. The support 40 is preferably formed of sheet metal with a longitudinally extending V-shaped depression as particularly shown in Figures 4 and 9, the longitudinal edge portions of member 40 being toothed to provide a rack-like formation as illustrated at 46.

Positioned immediately beneath the support 40 and arranged for relative slidable movement with respect thereto is a member or drawbar 48 which has a V-shaped longitudinally extending depression to coincide with or fit the depressed central portion of the member 40. The coinciding depressed portions of members 40 and 48 provide suitable guiding means for member 48 in its movement along the support 40. The drawbar 48 is provided at each end with upwardly extending sets of ears 49 and 50 which have laterally projecting portions taking over the upper surface of member 40 so as to maintain the drawbar in proper slidable relationship with respect to the member 40. Drawbar 48 is also provided with a depending portion or arm 53 which is welded or otherwise secured thereto, and is provided with an opening through which extends a pin 39 for connecting the clevis 30 to the drawbar.

Mounted upon the support 40 is a carriage 52 which is formed by means of plates 54, 55 and 55', plates 55 and 55' having upwardly projecting ear portions 56 which project through similarly shaped openings in plate 54, the projections 56 being pressed into the opening in plates 55 and 55' to fixedly secure these plates to plate 54. The plates 54, 55 and 55' are provided with aligned openings to receive stub shafts 57 and 58, each stub shaft having fixed thereto a set of gears, each set comprising a gear 59 and a smaller gear 60, the larger gears 59 of each set being adapted for enmeshment with the rack formations 46 on the longitudinal edges of member 40, while the smaller gears 60 are adapted for enmeshment with the teeth or rack portions 51 formed upon the longitudinally extending edges of the drawbar 48. The stub shafts 57 and 58 are formed with flat surfaces 61 and the openings in each of the sets of gears 59 and 60 have correspondingly shaped openings so that the gears 59 and 60 of each set will rotate together on the stub shafts.

Suitably mounted for slidable movement above the V-shaped depression in member 40 is a longitudinally extending manipulating member or bar 63 which is of circular configuration in cross section in the embodiment illustrated, one extremity being arranged to extend through a suitable opening in the instrument panel 14 and a manipulating handle 64 is secured to the end of the bar 63 which may be of metal, Bakelite, or other suitable material, the color of which may be made to match the interior appointments of the vehicle if desired. The bar 63 extends through aligned openings in upwardly extending projections 65 and 66 integrally formed on plate 54 and secured to the end of bar 63 is a stop means or member 67, which is held in place on the bar 63 by means of a washer 68 and a screw 69 threaded into an opening in the end of bar 63. Bar 63 is formed on its upper portion with a series of spaced depressions or notches 70 so formed as to present vertical walls 71 forming a ratchet-like configuration for a purpose to be hereinafter explained.

Welded or otherwise secured in the V-shaped depression of support 40 is a stop member 62 as particularly shown in Figures 4 and 9 and the stop means or member 67 is of pear-shaped configuration as particularly shown in Figure 6 having the downwardly extending projecting portion 72 thereof extending into the V-shaped depression in support 40. When bar 63 is withdrawn the stop means 67 will engage with the fixed stop member 62 in support 40 to prevent bar 63 from being withdrawn beyond a predetermined position for a purpose to be hereinafter explained.

The plate 54 is formed with a semi-annular portion 73 above which extends bar 63 as particularly illustrated in Figure 10. Pivotally supported for pivotal movement in a horizontal plane about a pivot 75 fixed in plate 54 is a member 76, the extremity of the member 76 being formed with an integral downwardly extending clutch or locking pawl 77 which extends adjacent the edge of plate 54 and is adapted for engagement with the teeth 46 of the support or member 40. As particularly exemplified in Figure 11, the portion of the pawl or tooth 77 engageable with the teeth 46 is so formed as to permit the pawl to override along teeth 46 when the carriage is moved in a right hand direction as viewed in Figures 4 and 11 but which will engage any tooth of toothed formation 46 to prevent return movement of the carriage 52 in a left hand direction without the pawl being positively moved out of engagement with teeth 46. The member 76 is provided with an upwardly extending projection 80 around which is looped the central portion of a spring 81, one end 82 of the spring 81 being secured to an upwardly extending projection 65 formed on plate 54, the other end of the spring extending into an opening 79 in member 76, the spring serving to normally urge member 76 and the locking tooth 77 toward locking engagement with teeth 46 of member 40.

Slidably mounted upon bar 63 adjacent the portion 73 of plate 54 is a collar or cam 83 which is provided with a cam or cam surface 84 which is adapted for cooperative relation with an upwardly projecting integral portion 85 of member 76 to effect a disengagement of pawl 77 with the teeth 46 of member 40 to unlock or release the carriage 52. The collar 83 is provided with an inwardly extending integral projection 88 which extends into a longitudinally extending keyway 89 formed in bar 63 so that rotational movement of bar 63 will cause rotational movement of collar 83 and cam surface 84 to cause the cam to engage projection 85 of member 76 and move the pawl 77 out of engagement with teeth 46. The plate 54 adjacent one end of cam 83 is formed with upwardly extending projections 74 which with portion 73 of the plate serves to maintain the cam 83 in its proper position in the carriage 52 irrespective of the position of the carriage along support 40 and bar 63.

Pivotally supported upon a stub shaft or rivet 92 is a member 93 having an arm 94 normally lying in the path of the notches 70 in bar 63. Member 93 is provided with a portion 95 beneath which is positioned an expansive coil spring 96, the lower portion of the spring resting upon the upper surface of plate 54, there being a projection 97 struck up from plate 54 to position the spring 96 beneath the arm 95. This spring 96 at all times serves to urge portion 94 of member 93 into contact with the surface of bar 63. Between projection 65 and the projections 74 of plate 54 is a slot 98 therein to permit clutch arm 94 to directly contact bar 63.

With particular reference to Figures 4, 5 and 12 through 15 inclusive, there is secured to the instrument panel 14 a sheet metal bracket 101 having leg portions 102 and 103 which are provided with aligned openings to slidably accommodate manipulating bar 63, the bracket being secured to the instrument panel by means of a rivet 104 or other suitable securing means. Loosely and slidably positioned upon bar 63 and positioned between leg portions 102 and 103 is a member 105 having a projection 106 adapted for engagement with an upper surface of the support 40 as illustrated in Figure 12, the member 105 having a projection 107 which is adapted upon rotation of bar 63 to engage the upper surface of support 40 to limit the rotational movement of bar 63, member 105 having a projection 108 extending into the keyway 89 formed in bar 63 so as to be rotated with bar 63 but so mounted that bar 63 may slide within member 105. A spring 109 having convolutions surrounding bar 63 is shown in Figure 13 has one end 110 thereof taking over projection 106 while the other end 111 of the spring is hooked over an edge wall of bracket 101. The spring 109 serves at all times to resiliently maintain bar 63 and member 105 in a position with respect to rotation as shown in Figure 12, which places the notches 70 in the position shown in Figures 4 and 5 in the path of the pawl or member 93 carried by the carriage 52.

Pivoted to the instrument panel by means of a stub shaft or rivet 114 is a bell crank or dog 115 having a projection 116 adapted to extend into the keyway 89 of bar 63 whenever the bar is withdrawn from the normal position indicated in Figures 4 and 5. As shown in Figures 13 and 15, keyway 89 does not extend full length of bar 63, but terminates at a point indicated by 117, so that when bar 63 is in the position with a manipulating handle 64 adjacent the instrument panel 14, the projection 116 of dog 115 rests upon the exterior circular peripheral surface of bar 63 as shown in Figures 14 and 15, in which condition the bar 63 may be partially rotated as far as stop member 107 will permit, i. e., until the latter engages the upper surface of support 40. However, as soon as bar 63 is withdrawn from the position as shown in Figures 4, 5 and 13, projection 116 of dog 115 immediately enters into keyway 89 and with bar 63 in withdrawn position any rotational movement thereof is prevented.

The system and apparatus of my invention embodies means for visually indicating that the carriage 52, drawbar 48, and cable 29 have been moved to "brake setting" position even though the manipulating bar 63 is in normal position with respect to the instrument panel, that is, as shown in Figures 4 and 5. To this end, there is preferably mounted upon the instrument panel a visual indicating means in the form of a tell tale lamp 120 carried in a suitable housing 121 which is carried by the instrument panel, one lead wire 122 from the lamp being grounded as indicated as at 123 in Figure 1 by attaching the lead 122 to any suitable metallic portion of the vehicle which may form a metallic electrical path to the ground connection of the battery as indicated at 124 in Figure 1. Lead wire 125 terminates in a contact 126 positioned within a suitable switch housing 127 formed of insulating material or other suitable non-conductor. The switch housing 127 also contains a second terminal 128 which is connected by means of a lead 129 to one side of the ignition switch of the vehicle of conventional construction as indicated at 130, the ignition switch having a current supply conductor 119 which is connected to the source of energy as, for example, storage battery 25. The switch structure includes a slidable contact closing member 131 which is provided with a tenon portion 132 as particularly illustrated in Figure 3 which projects exteriorly of the switch housing. The switch housing 127 has an interior chamber 133 in which the terminals or contacts 126 and 127 are positioned, the walls of the chamber being threaded to accommodate the threaded tenon of the bolt 44 which secures the support 40 to the dash board 12 and also serves to support the switch housing 127. Positioned within the switch housing is a coil spring 135 which serves at all times to urge member 131 toward engagement with contacts 126 and 128 which when engaged completes the circuit to energize the tell tale lamp 120 on the instrument panel with the ignition switch 130 also in closed or current carrying position. The ignition switch may be closed by the usual ignition key 13 shown in Figure 1. As illustrated in Figures 3 and 5, whenever the carriage 52 is in its extreme brake released position, that is, the position shown in Figures 3, 4 and 5, the upstanding wall or projection 66 of the carriage 52 strikes or engages the extremity of the switch pin 132 compressing spring 135 and opening the circuit between the terminals or contacts 126 and 128 to break the circuit to the tell tale light 120, and this may occur irrespective of the position of the brake manipulating bar 63, as it is the position of the carriage 52 which determines the condition of the brakes being in "set" or "released" position.

The operation of the brake control system and apparatus of my invention hereinbefore described is as follows:

When it is desired to "set" the brakes of the vehicle, the operator or driver grasps the handle 64 withdrawing or moving the manipulating bar 63 away from the instrument panel 14 along the stationary member or support 40 and through the medium of the stop means 67 fixedly secured to the manipulating member 63, the carriage 52 is concurrently moved with bar 63. As the carriage 52 is moved with bar 63, through the medium of the gears 59 and 60 enmeshing respectively with the toothed sections or portions of the stationary member 40 and the drawbar 48, a differential movement of the drawbar 48 is effected in the same direction of movement as that imparted to the manipulating bar 63 but through a lesser distance. The difference in travel between the manipulating member 63 and the drawbar 48 and consequently the difference in the amount of force exerted to the mechanism connected thereto is dependent upon the difference in pitch diameters of gears 59 and 60 bears to the pitch diameter of the larger gear 59. In the embodiment illustrated, the difference in movement between carriage 52 and drawbar 48 determines the amplitude of force applied to the braking mechanism, and this amplitude is in the ratio of 1 to 5, that is, the difference in the pitch diameters of gears 59 and 60 is one-fifth of the pitch diameter of the larger gear 59, that is, the pitch diameter of gear 60 is one-fifth less than the pitch diameter of gear 59. Thus, if the carriage is moved through a horizontal distance of five inches by the manipulating bar 63 the drawbar 48 connected to the braking mechanism is moved through a distance of only one inch and the force of, for example, twenty pounds applied to the carriage 52 and manipulating bar 63 by the operator is thereby multiplied to exert an effective force of one hundred pounds upon the drawbar 48 which is transmitted to the braking mechanism. The pulling or withdrawing of the bar 63 to impart movement to the carriage 52 will cause the locking tooth or pawl 77 to override the teeth 46 of the stationary member 40 but will cause automatic engagement with the teeth whenever this movement is stopped or when the manipulating member 63 is moved toward the instrument panel 14. When the manipulating member 63 has been moved away from the instrument panel 14 a predetermined distance, a corresponding movement is imparted to the carriage in the same direction, the carriage being locked in the position to which it has been moved through the pawl 67 engaging teeth 46 of support 44, after which the manipulating bar 63 can be returned or moved to its original normal position without returning the carriage. Thus, there is provided means whereby movement to the carriage and drawbar is imparted in only one direction so that when it is desired to impart additional movement to the drawbar 48, further movement to the carriage 42 may be imparted through the manipulating member 63 by causing the engagement of the vertical wall 71 of one of the spaced depressions or notches 70 in bar 63 with the pivot member or pawl 93, so that their inter-engagement serves to effect a driving connection between the manipulating member 63 and the carriage 52 to impart through the gears 59 and 60 additional movement to the drawbar 48 toward brake "setting" position. The notches 70 are so formed with respect to the clutching member or pawl 93 that movement of the manipulating bar 63 toward the instrument panel 14 will cause the member 93 to override the notches 70, and in this manner prevent the carriage from being returned to brake "released" position by the manipulating bar 63. When the drawbar 48 has been brought to brake setting position by repeated hitching action of the manipulating member 63 to the carriage 52, it will be necessary when it is desired to release the brake to not only return the manipulating handle 64 to normal position as shown in Figure 4, but at the same time to rotate the handle 64 and bar 63 in the direction indicated by the arrow in Figure 2 so as to cause the disengagement of the locking pawl 77 with the teeth 46, which is effected by the wall or cam surface 84 of the cam member 83 engaging the projecting portion 85 of the pivot member 76 to move against the action of the spring 81 and thus when the cam wall 84 is in full engagement with the pivotal member, the locking pawl is thus moved out of the path of the tooth or rack 46 and due to the action of the spring 29 connected to the brake control mechanism tending to urge the same toward released position, the drawbar 48 and the carriage is moved to the position illustrated in Figure 4 without imparting any longitudinal movement to bar 63. The rotation of bar 63 to effect a release of the carriage from the support or member 40 also moves the notches 70 out of the path of the clutch or pawl 94, the pawl during return movement of the carriage to brake released position contacting or riding upon the smooth peripheral portion of bar 63, thus permitting the carriage to complete its return movement into engagement with the stop means 67. As hereinbefore pointed out, during the time that the carriage is away from the normal or brake "released" position or away from the switch 127, the normal open contacts of the tell tale device 120 are reached by member 132 due to the action of the spring 135 thus closing the circuit to the tell tale lamp 120 which, if the ignition switch 139 is in closed position, energizes the lamp 120 and indicating that the brakes are in "set" position or that the brakes are partially applied to the vehicle. However, when the carriage 52 is returned to its normal or brake "released" position, the circuit of the tell tale device 120 is interrupted by causing the portion 66 to engage the plunger 132 biasing the action of the spring 135 so that the circuit is normally open.

It should be noted that due to the special arrangement of the locking pawl or dog 115 with respect to the keyway 89 in drawer 63 particularly as shown in Figures 12, 14 and 15, accidental release of the brake cannot be accomplished in that it is necessary that the manipulating handle or drawbar 63 be moved to its normal innermost position whereby the same is in contact with the instrument panel 14 as in any other position, rotative movement to the handle 64 and bar 63 is prevented by the interlocking engagement of the pawl 116 in keyway or slot 89. In addition, it should be noted that at all times with the ignition switch in closed circuit position, the operator is automatically notified that the brakes are in "set" position by the visual indication caused by the energization of the tell tale device 120. Furthermore, the arrangement illustrated is such that by changing the relation between the pitch diameters of the gears 59 and 60, an infinite number of variations may be obtained in the ratio of force applied to the brake cable and drawbar and range of travel imparted to the drawbar 48 through the manipulating bar 63 and carriage 52 can be obtained.

It is to be noted that there are several teeth 71 arranged at spaced intervals upon the manipulating bar 63 so that any one tooth will be in a position to engage with the pawl 94 which makes it unnecessary to withdraw manipulating bar 63 to any predetermined position before a new hitch may be made between one of the teeth 71 and clutch or pawl 93 to carriage 52. However, in order to prevent bar 63 from being withdrawn to an extreme position with the handle 64 a comparatively long distance from the instrument panel, which may render the bar 63 capable of being bent or otherwise distorted under severe abnormal movement by surreptitious persons, it has been found desirable to include the stop member 62 cooperating with the stop means 72 to limit any one successive movement of bar 63. When the bar 63 has been moved to the extent permitted by the stop 62, it may then be returned to its normal innermost position and a new hitch made with the carriage 52. Successive movements of manipulating bar 63 may be made until the carriage 52 and drawbar 48 have effected a "setting" of the brakes. It is further to be noted that with the arrangement of my invention the manipulating bar 63 and handle 64 may always be placed in a normal innermost position with respect to the instrument panel irrespective of whether the brakes are in "set" or "released" position so that the handle and bar 63 are at all times out of the way of the driver's compartment.

It is apparent that within the scope of the invention, modifications and different arrangements may be made other than is herein disclosed, and the present disclosure is illustrative merely, the invention comprehending all variations thereof.

What I claim is:

1. A mechanism control including, a relatively stationary element having a toothed rack portion; a movable member slidable along said element and having a toothed rack portion; said member adapted to be connected to the mechanism to be actuated; a manipulating member arranged for slidable movement with respect to said stationary element; a carriage arranged for slidable movement with respect to said manipulating member; a member carried by said carriage having engagement with means formed on said manipulating member for establishing a one way driving connection therebetween whereby said carriage is moved by said manipulating member; a clutch associated with said carriage having engagement with one of said toothed rack portions for restraining movement of the carriage with respect to the manipulating member; and gearing supported upon said carriage and meshing with the rack portions of said element and said movable member whereby movement of the manipulating member is transmitted to the movable member at a different rate of speed.

2. A mechanism control comprising, in combination, a relatively stationary member having a rack portion; a movable member having a rack portion arranged for slidable movement with respect to said stationary member; a manipulating member arranged for slidable movement with respect to said members; a movable carriage adapted to be connected to said manipulating member; gearing supported upon said carriage and meshing with the rack portions of said stationary member and said movable member; a clutch carried by said carriage having engagement with one of said members for restraining movement thereof in one direction; and means actuated by said manipulating member for rendering said clutch ineffective.

3. A mechanism control comprising, in combination, a relatively stationary supporting element; a movable element slidable along said supporting element; a manipulating member arranged for slidable movement with respect to said supporting element; a carriage arranged for slidable movement with respect to said manipulating member; means carried by said carriage for establishing a driving connection with said manipulating member; motion translating means carried by said carriage whereby when a driving connection is established between said manipulating member and carriage movement imparted to the manipulating member is transmitted to the movable member; a clutch carried by said carriage and having engagement with one of said elements for locking the carriage in adjusted position; and means actuated by said manipulating member for rendering said clutch ineffective.

4. A mechanism control including, a relatively stationary support; a movable member slidable along said support adapted to be connected to the mechanism to be actuated; a manipulating member arranged for slidable movement with respect to said stationary support; a carriage arranged for slidable movement with respect to said members; means interposed between said carriage and manipulating member for establishing a driving connection therebetween when said manipulating member is moved in one direction; means carried by said carriage coacting with said movable member whereby movement of the manipulating member is transmitted to the movable member; and a clutch associated with said carriage operable to restrain slidable movement between said carriage and said movable member.

5. A mechanism control including, a relatively stationary element having a toothed rack portion; a movable member slidable along said element and having a toothed rack portion; a manipulating member arranged for slidable movement with respect to said stationary element; a carriage arranged for slidable movement with respect to said manipulating member; means carried by said carriage for establishing a one way driving connection with said manipulating member; a clutch carried by said carriage for locking the carriage in position while the driving connection with the manipulating member is ineffective; and motion translating means associated with said carriage coacting with the toothed rack portions of said element and member whereby movement of the manipulating member is transmitted to the movable member at a different rate of speed.

6. A mechanism control comprising, in combination, a relatively stationary member; a relatively movable member supported by and slidable along said stationary member and adapted to be connected to the mechanism to be actuated; a manipulating element slidably mounted with respect to said relatively stationary member and arranged for movement in a direction parallel with that of said relatively movable member; motion translating means arranged for slidable movement with respect to said manipulating element and for movement therewith; said motion translating means having an interconnection with said stationary and movable members whereby movement of said manipulating element is transmitted to said movable member at a different rate of speed; locking means associated with said relatively stationary member for restraining movement of said motion translating means; and means operable by said manipulating element for effecting a release of said locking means.

7. A mechanism control including a relatively stationary element; a pair of members mounted for parallel slidable movement with respect to said element; one of said members adapted to be connected to the mechanism to be actuated and the other to be manually operated; motion translating means including gearing establishing operative connection between one of said members and element; and means coacting with one of said members and said motion translating means whereby reciprocatory manual movement imparted to one of said members is transmitted in only one direction to the other member at a different rate of speed.

8. A mechanism control including a relatively stationary element; a pair of members having reciprocatory slidable movement with respect to said element; one of said members adapted to be connected to the mechanism to be actuated and the other to be manually operated; motion translating means including a carriage movable with respect to said members and element; gearing mounted on said carriage establishing connection between said element and one of said members; and means coacting with one of said members and said motion translating means whereby reciprocatory manual movement imparted to one of said members is transmitted in only one direction to the other member.

9. Mechanism control comprising, in combination, a support; a member mounted upon and slidable longitudinally of said support and being adapted for connection to mechanism to be operated; a manipulating member having reciprocatory slidable movement in a direction parallel with said first mentioned member and said support; means for establishing an operative connection between said manipulating member and said relatively movable member whereby both are moved in the same direction to mechanism actuated position; means for locking the relatively movable member in mechanism actuated position while said manipulating member is returned to its initial position; and means actuated by said manipulating member and operable only when said manipulating member is in its initial position to effect a release of said relatively movable member whereby the latter may be released from its locked position.

10. Mechanism control comprising, in combination, a relatively movable member adapted for connection to mechanism to be operated; a manipulating element longitudinally reciprocable relative to said member; means for establishing an operative connection between said manipulating element and said relatively movable member whereby both are moved in the same direction to mechanism actuated position; means for locking the relatively movable member in mechanism actuated position while said manipulating element is returned to its initial position; and means actuated by rotational movement of said manipulating member and operable only when said manipulating member is in its initial position to effect a release of said locking means.

11. A mechanism control including a relatively stationary element having a toothed rack portion; a member formed with a toothed rack portion having reciprocatory slidable movement with respect to said element; a second member having reciprocatory movement with respect to said element and the first mentioned member; means carried by said first mentioned member for connecting the same to the mechanism to be actuated; motion translating means including gearing enmeshing with the rack portions of said first mentioned member and element; means coacting with the second mentioned member and said motion translating means to establish an operative connection therebetween whereby reciprocatory movement imparted to the second mentioned member is transmitted in only one direction to the first mentioned member; and means for locking said motion translating means in position thereby restraining movement of the first mentioned member.

12. A mechanism control including a relatively stationary element; a pair of members having a reciprocatory movement with respect to said element; one of said members adapted to be connected to the mechanism to be actuated; motion translating means including a carriage relatively movable with respect to said members and element; means coacting with one of said members and said carriage to establish an operative connection therebetween whereby reciprocatory movement imparted to one of said members is transmitted in only one direction to the member connected to the mechanism to be actuated; and means for restraining movement of said member connected to the mechanism to be actuated with respect to said stationary element.

13. A mechanism control including a relatively stationary element; a pair of members having reciprocatory slidable movement with respect to said element; one of said members adapted to be connected to the mechanism to be actuated and the other manually actuated; motion translating means including a carriage relatively movable with respect to said members and element; means coacting with the manually actuated member and said carriage to establish an operative connection therebetween whereby reciprocatory movement imparted to said manually actuated member is transmitted in only one direction to the member connected to the mechanism to be actuated; means for restraining movement of said member connected to the mechanism to be actuated with respect to said stationary element; and means for rendering said restraining means ineffective.

CHARLES S. McCARTHY.